UNITED STATES PATENT OFFICE.

RUDOLF STRAUBEL, OF JENA, GERMANY, ASSIGNOR TO THE FIRM OF CARL ZEISS, OF JENA, GERMANY.

REFLECTING-PRISM.

1,044,102.  Specification of Letters Patent.  Patented Nov. 12, 1912.

No Drawing.  Application filed January 25, 1910.  Serial No. 540,076.

*To all whom it may concern:*

Be it known that I, RUDOLF STRAUBEL, a citizen of the German Empire, residing at Carl-Zeiss strasse, Jena, in the Grand Duchy of Saxe-Weimar, Germany, have invented a new and useful Reflecting-Prism, of which the following is a specification.

The invention relates to telemeters and their adjusting devices. It offers a novel means for overcoming a disadvantage, which the constructors of telemeters for some years past have found to be the principal cause, that the adjustment of the telemeters needs correction again and again, often after very short periods, and that also the invariability of the adjusting devices leaves still much to be desired. This disadvantage consists in the temporary variations in the optical effect, which are inherent in the reflecting prisms employed, even when made most perfectly.

The physical properties of the reflecting prisms, upon which the said temporary variations in their optical effect depend, have been set forth by an expert on the first two pages of the British specification 13562/07. There it is proved—after reference to the great absorption of light the glass produces and to the astigmatic and comatic errors of the reflected images, which errors result from strain in the reflecting prism—that the said strain, which even in well annealed glasses still remains, and the low conductivity of the glass are the two main sources of those temporary variations. According to the said British specification, redress is possible by reducing as much as possible the path of the light through glass, for example, by replacing a double reflecting prism by two thin plates of glass silvered at the back.

According to the present invention, the remedy consists in making of quartz, fused or non-fused, the reflecting prisms of instruments used in telemetry, telemeters as well as their adjusting devices. Among the reflecting prisms of the telemeters the entrance prisms are most in need of the advantage conferred by the invention, because changes of their optical effect influence the result of measuring more than similar changes occurring in the ocular prism system.

Reflecting prisms of quartz, at least of non-fused quartz have already been employed, where permeability, especially for ultraviolet rays, was required. But for the purpose of the present invention it comes into consideration, that quartz has not only a low coefficient of absorption, but above all an exceptionally great conductivity. In non-fused quartz, at an average for the two physical principal directions of the crystal, the conductivity is about 10 times, and in fused quartz it is about five times, as great as the average conductivity of optical glasses, which as far as qualified for prisms are only slightly different in this respect. As a crystal formed without disturbances is homogeneous and free from strain, non-fused quartz can not induce the optical disadvantages which otherwise result from the non-homogeneousness and the strain of the glass of the prisms. As to fused quartz, it is homogeneous likewise and, when well annealed, nearly without strain, as will be understood from the fact that its thermal expansion amounts hardly to the fifteenth part of the average thermal expansion of optical glasses.

It will be understood that in the case of non-fused quartz, in order to produce simple reflected images, the reflecting prism, which may be simple or multiple reflecting, must have been cut out of the crystal in such a position that its double refraction becomes not or not essentially efficient, for example, so that the optical axis of the crystal lies at right angles to the principal section of the prism.

I claim:

The combination with instruments used in telemetry of reflecting prisms made of quartz.

RUDOLF STRAUBEL.

Witnesses:
 PAUL KRÜGER,
 ALFRED MACKEDANZ.

Copies of this patent may be obtained for five cents each, by addressing the "Commissioner of Patents, Washington, D. C."